United States Patent
Kamat et al.

(10) Patent No.: US 8,150,998 B2
(45) Date of Patent: Apr. 3, 2012

(54) SYSTEM AND METHOD FOR INCREASING OPTIMAL ALTERNATIVE NETWORK ROUTE CONVERGENCE SPEED AND BORDER GATEWAY ROUTER INCORPORATING THE SAME

(75) Inventors: Sanjay D. Kamat, Marlboro, NJ (US); Pramod V. N. Koppol, Aberdeen, NJ (US)

(73) Assignee: Alcatel Lucent, Paris (FR)

(*) Notice: Subject to any disclaimer, the term of this patent is extended or adjusted under 35 U.S.C. 154(b) by 1732 days.

(21) Appl. No.: 10/670,940

(22) Filed: Sep. 25, 2003

(65) Prior Publication Data
US 2005/0071502 A1 Mar. 31, 2005

(51) Int. Cl.
G06F 15/173 (2006.01)
G01R 31/08 (2006.01)
H04M 7/00 (2006.01)

(52) U.S. Cl. ............ 709/238; 370/249; 379/221.01
(58) Field of Classification Search .......... 709/238, 709/239; 370/249; 379/221.01
See application file for complete search history.

(56) References Cited

U.S. PATENT DOCUMENTS

| | | | | |
|---|---|---|---|---|
| 6,047,331 | A * | 4/2000 | Medard et al. | 709/239 |
| 6,154,448 | A * | 11/2000 | Petersen et al. | 370/248 |
| 6,393,486 | B1 * | 5/2002 | Pelavin et al. | 709/238 |
| 6,728,205 | B1 * | 4/2004 | Finn et al. | 370/217 |
| 6,850,486 | B2 * | 2/2005 | Saleh et al. | 370/218 |
| 6,985,959 | B1 * | 1/2006 | Lee | 709/238 |
| 6,985,963 | B1 * | 1/2006 | Johnson et al. | 709/242 |
| 7,133,358 | B2 * | 11/2006 | Kano | 370/221 |
| 7,293,077 | B1 * | 11/2007 | Teo et al. | 709/221 |
| 7,457,233 | B1 * | 11/2008 | Gan et al. | 370/216 |
| 7,463,581 | B1 * | 12/2008 | Ellis et al. | 370/228 |
| 2002/0021675 | A1 * | 2/2002 | Feldmann | 370/254 |

* cited by examiner

Primary Examiner — Asghar Bilgrami
(74) Attorney, Agent, or Firm — Hitt Gaines, PC

(57) ABSTRACT

For use with a path vector routing protocol, a system and method for increasing alternative network route convergence speed and a border gateway router incorporating the system or the method. In one embodiment, the system includes: (1) a router information base (RIB) data receiver, associated with a network, that receives RIB data including: (1a) an update of an active route to a domain in the network that causes the active route to become a withdrawn route and (1b) indications, based on loopback addresses associated with nodes through which the withdrawn route passed, of a reachability of the each of the nodes and (2) route disqualification logic, associated with the RIB data receiver, that disqualifies alternative routes to the domain based on the indications.

20 Claims, 3 Drawing Sheets

SYSTEM AND METHOD FOR INCREASING OPTIMAL ALTERNATIVE NETWORK ROUTE CONVERGENCE SPEED AND BORDER GATEWAY ROUTER INCORPORATING THE SAME

TECHNICAL FIELD OF THE INVENTION

The present invention is directed, in general, to computer networks and, more specifically, to a system and method for increasing optimal alternative network route convergence speed and a border gateway router incorporating the system or the method.

BACKGROUND OF THE INVENTION

Computer networks have become critical to today's society. Their importance is reflected not only in the number of elements (such as servers, clients, hubs, routers and gateways) that are coupled together to form a network, but also in the varied and complex ways those elements are interconnected. Undisputably the most widely recognized example of a complex, distributed computer network is the Internet, which is responsible for interconnecting countless subnets and individual servers and clients.

As networks have become more complex, network configuration and management have likewise become more automated and standardized. Network configuration involves informing the various elements of their physical or logical connections ("links") with one another such that optimal routes for information flow through the network can be defined. Network management involves, among other things, monitoring the links such that optimal routes can be redefined if new elements or links are introduced or if an active route is lost (perhaps due to element or link failure). The Internet works as well as it does in part because it has the ability to route around communications failures.

A comprehensive and standard protocol, the Border Gateway Protocol (BGP), has been developed expressly for routing. According to BGP, certain routers in the network periodically share, or "advertise," information (called Router Information Base, or RIB, data) among themselves so they can keep track of each others' connections and thereby define the optimal routes. BGP is properly classified as a path vector routing protocol.

BGP allows networks to be compartmentalized to simplify routing. One concept designed into BGP is that of the Autonomous System, or AS. An AS is a collection of interconnected and cooperating network elements that can function independent of outside influence. BGP is employed both within ASs (so-called "internal" BGP, or IBGP) and between ASs that are coupled together (so-called "external" BGP, or EBGP). When viewed from a very high level, this feature of EBGP allows the ASs that make up a large network to be abstracted as single entities and managed as such.

EBGP is designed to deal with equipment or link failures. Once a border gateway router detects the loss of an active route, it sets about testing alternative routes through the network in an order that is determined at least in part by the speed of the alternative routes. It tests the alternative routes sent to it by neighboring border gateway routers. Thus, the loss of an active route can precipitate a substantial "conversation" among the border gateway routers as they try to work around the loss by converging on an optimal alternative route.

Unfortunately, BGP lacks a mechanism for diagnosing the cause underlying the loss. Lacking a diagnosis, the iterative testing process is ill-informed, resulting in the unnecessary consumption of time and network bandwidth as fruitless alternative routes are tested. What is needed in the art is a faster way to converge on an optimal alternative route upon the loss of an active route.

SUMMARY OF THE INVENTION

To address the above-discussed deficiencies of the prior art, the present invention provides, for use with a path vector routing protocol such as BGP, a system and method for increasing alternative network route convergence speed and a border gateway router incorporating the system or the method. In one embodiment, the system includes: (1) a RIB data receiver, associated with a network (typically a particular node in the network), that receives RIB data including: (1a) an update of an active route to a domain in the network that causes the active route to become a withdrawn route and (1b) indications, based on loopback addresses associated with nodes through which the withdrawn route passed, of a reachability of the each of the nodes and (2) route disqualification logic, associated with the RIB data receiver, that disqualifies alternative routes to the domain based on the indications. The indications take the form of active routes to the nodes or withdrawals of active routes to the nodes, whichever the case may be for a particular node. The nodes may be routers, ASs or any intermediate point along a route with which a loopback address may be associated.

The present invention is based on the realization that loopback addresses can provide a mechanism for diagnosing the cause underlying the loss of an active route. By identifying causes for the loss, alternative routes necessarily compromised by the cause can be eliminated from the optimal alternative route selection process. Thus, the process of finding an optimal alternative route becomes faster and less consumptive of network bandwidth. It should be understood that routing policies not be applied to the loopback addresses therefore resulting in an optimal path for loopback addresses.

In one embodiment of the present invention the route disqualification logic disqualifies all alternative routes to the domain if all of the nodes are indicated as reachable. Thus the route disqualification logic has inferred that the domain itself is unreachable by any alternative route. Any further effort to converge on an alternative route is halted.

In one embodiment of the present invention the route disqualification logic disqualifies alternative routes to the domain that pass through unreachable ones of the nodes. Thus the route disqualification logic has inferred that the domain itself may be reachable by an alternative route. However, routes that encompass any unreachable nodes are disqualified, reducing the time and bandwidth required to converge on an optimal alternative route.

In one embodiment of the present invention, the loopback addresses are distinguishable from ordinary network addresses. In more specific embodiments, the loopback addresses are formed in accordance with a Border Gateway Protocol extension or assigned canonically.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
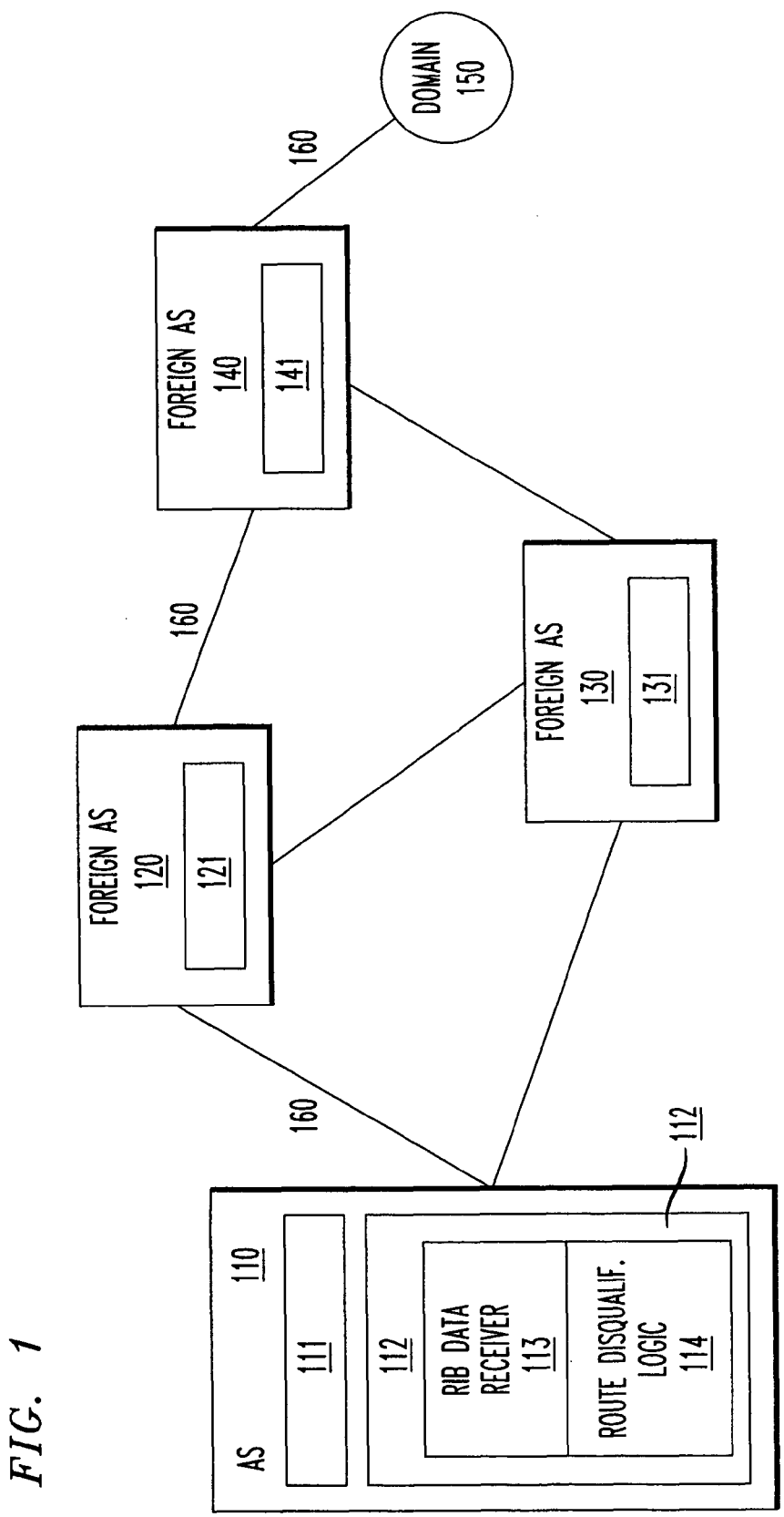
FIG. 1 illustrates a system for increasing alternative network route convergence speed constructed according to the principles of the present invention.

Referring initially to FIG. 1 illustrated is a computer network 100 that, among other things, includes a border gateway router incorporating a system for increasing alternative network route convergence speed constructed according to the principles of the present invention.

The computer network 100 is illustrated as including an AS 110 that includes a border gateway router (not referenced) that, in turn, includes a system constructed according to the principles of the present invention. The computer network 100 further illustrates a first foreign AS 120, a second foreign AS 130 and a third foreign AS 140 that, among other things, serve as nodes for communication of information between the AS 110 and a domain 150. Accordingly, each foreign AS 120, 130, 140 includes a border gateway router (not separately shown in FIG. 1). Each border gateway router has a preassigned loopback address that is unique to each border gateway router. The loopback addresses of each of the AS 110, first foreign AS 120, second foreign AS 130 and third foreign AS 140 are designated 111, 121, 131, 141, respectively. It should also be stated that loopback addresses are not typically subject to routing policies.

As those skilled in the pertinent art understand, conventional border gateway routers periodically advertise RIB data to each other to facilitate network management. However, in addition to the standard RIB data, the border gateway routers in the ASs 110, 120, 130, 140 further advertise routes pertaining to loopback addresses of border gateway routers of neighboring ASs. Thus, for example, the border gateway router (not referenced) associated with the first foreign AS 120 advertises routes pertaining to loopback addresses of neighboring ASs, including the AS 110, the second foreign AS 130 and the third foreign AS 140.

The system for increasing alternative network route convergence speed constructed according to the principles of the present invention is designated 112 and includes a RIB data receiver 113 and route disqualification logic 114. The operation of the system 112 will now be described in terms of an example.

It is initially assumed that a routing table memory in the border gateway router (not referenced) of the AS 110 contains a routing table of active routes within the network 100, including an exemplary active route 160 from the AS 110 to the domain 150. Though many alternative routes may exist from the AS 110 to the domain 150, conventional BGP route selection techniques have determined that the active route 160 is optimal. It is evident that the active route 160 passes through the first foreign AS 120 and the second foreign AS 130 on its way from the AS 110 to the domain 150. Thus, the first and second foreign ASs 120, 130 serve as nodes along the active route 160.

It is now assumed that the RIB data receiver 113 has received RIB data advertised from the first and second foreign ASs 120, 130. The RIB data include an update message indicating that the active route 160 has been withdrawn. (The active route 160 has now become a withdrawn route 160.) The withdrawal of the withdrawn route 160 indicates that equipment or a link has been removed from, or has failed along, the withdrawn route 160 or, alternatively, the domain 150 has itself failed.

As described above, conventional EBGP has no mechanism for isolating the cause of the withdrawal of the withdrawn route 160. Accordingly, all alternative routes between the AS 110 and the domain 150 would be tested in the process of finding an alternative route. It is evident that some, if not all, of the effort to find an alternative route would be fruitless, but the forethought to avoid the wasted time and bandwidth is not available in conventional EBGP.

By virtue of the loopback addresses, the system 112 of the present invention, however, has access to indications (active routes or withdrawals thereof) in the RIB data of a reachability of the first, second and third foreign ASs 120, 130, 140. The system 112 can use these indications to advantage.

The route disqualification logic 114 analyzes the RIB data to ascertain the reachability of the first and second foreign ASs 120, 130. If an active route exists in the RIB data for the loopback address of the first foreign AS 120, the route disqualification logic 114 infers that the link of the withdrawn route 160 extending from the AS 110 to the first foreign AS 120 is not faulty and that the first foreign AS 120 is not faulty. Likewise, if an active route through the first foreign AS 120 exists in the RIB data for the loopback address of the second foreign AS 130, the route disqualification logic 114 infers that the link of the withdrawn route 160 extending from the first foreign AS 120 to the second foreign AS 130 is not faulty and that the second foreign AS 130 is not faulty.

Thus, given that the only route through the network 100 to the domain 150 passes through the second foreign AS 130, the route disqualification logic 114 assumes that either the link extending from the second foreign AS 130 to the domain 150 is faulty or the domain 150 itself is faulty; in either case, the domain 150 is unreachable.

Having drawn the inference that the domain 150 is unreachable, the route disqualification logic 114 disqualifies all alternative routes to the domain 150. This effectively ends any EBGP process of finding an optimal alternative route to the domain 150 before it even begins.

Changing the example slightly, assume that in addition to the update message withdrawing the active route 160, the RIB data includes an update message pertaining to an active route between the AS 110 and the loopback address of the first foreign AS 120 (a link in the withdrawn route 160) and a further update message pertaining to an active route between the AS 110 and the second foreign AS 130 (another link in the withdrawn route 160). This renders the first foreign AS 120 directly unreachable. However, it is assumed that the RIB data includes a route between the AS 110 and the third foreign AS 140.

The route disqualification logic 114 then analyzes RIB data from the third foreign AS 140 to determine whether the second foreign AS 130 is reachable from the third foreign AS 140. If so, the route disqualification logic 114 infers that only the first foreign AS 120 is unreachable, and cannot infer that the domain 150 is unreachable. Thus, the route disqualification logic 114 disqualifies only the alternative routes that include the first foreign AS 120. In the simple network 100 of FIG. 1, the only alternative route that would be disqualified is the withdrawn route 160. In more complex, real-world networks, perhaps hundreds of alternative routes could be disqualified based on inferences such as these.

In the illustrated embodiment of the present invention, the loopback addresses are distinguishable from ordinary network addresses, such as the network address that identifies the domain 150. The loopback addresses can be so distinguished in several ways. One is to develop an extension to EBGP in which additional characters are allotted to designate loopback addresses. Another is canonical assignment, in which a block of network address space is reserved for loopback addresses; addresses in that block, while retaining the format of network addresses, are defined to be loopback addresses.

Figure 2:
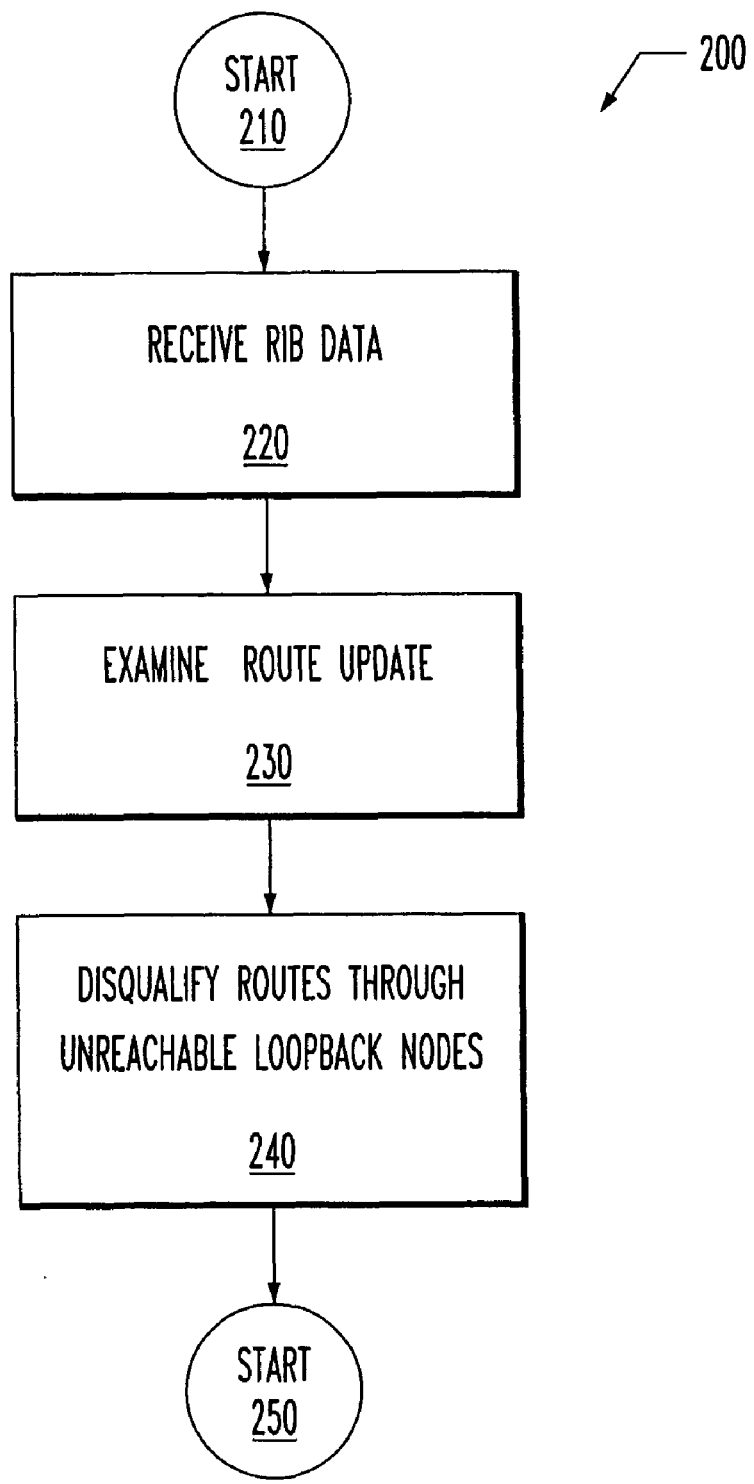
FIG. 2 illustrates a method of increasing alternative network route convergence speed carried out according to the principles of the present invention.

Turning now to FIG. 2, illustrated is a method, generally designated 200, of increasing alternative network route convergence speed carried out according to the principles of the present invention. The method begins in a start step 210.

RIB data pertaining to loopback addresses is received in a step 220. The method 200 of the present invention assumes that the RIB data includes an update of an active route to a domain in the network. The method 200 further assumes that the RIB data includes indications, based on loopback addresses associated with nodes through which the updated route passed, of a reachability of the each of the nodes. As previously described, these indications take the form of either active routes to the loopback addresses of the nodes or update messages pertaining to active routes to the loopback addresses of the nodes, whichever the case may be for a particular node.

The method then becomes a process of disqualifying alternative routes to the domain based on the indications. In a step 230, links and nodes in the updated route are examined. If one or more nodes in the withdrawn route are indicated as unreachable, alternative routes to the domain that pass through unreachable ones of the nodes are disqualified in a step 240. The method 200 ends in an end step 250, wherein normal EBGP optimal route selection takes place, assuming any qualified alternative routes to the domain exist.

Figure 3:
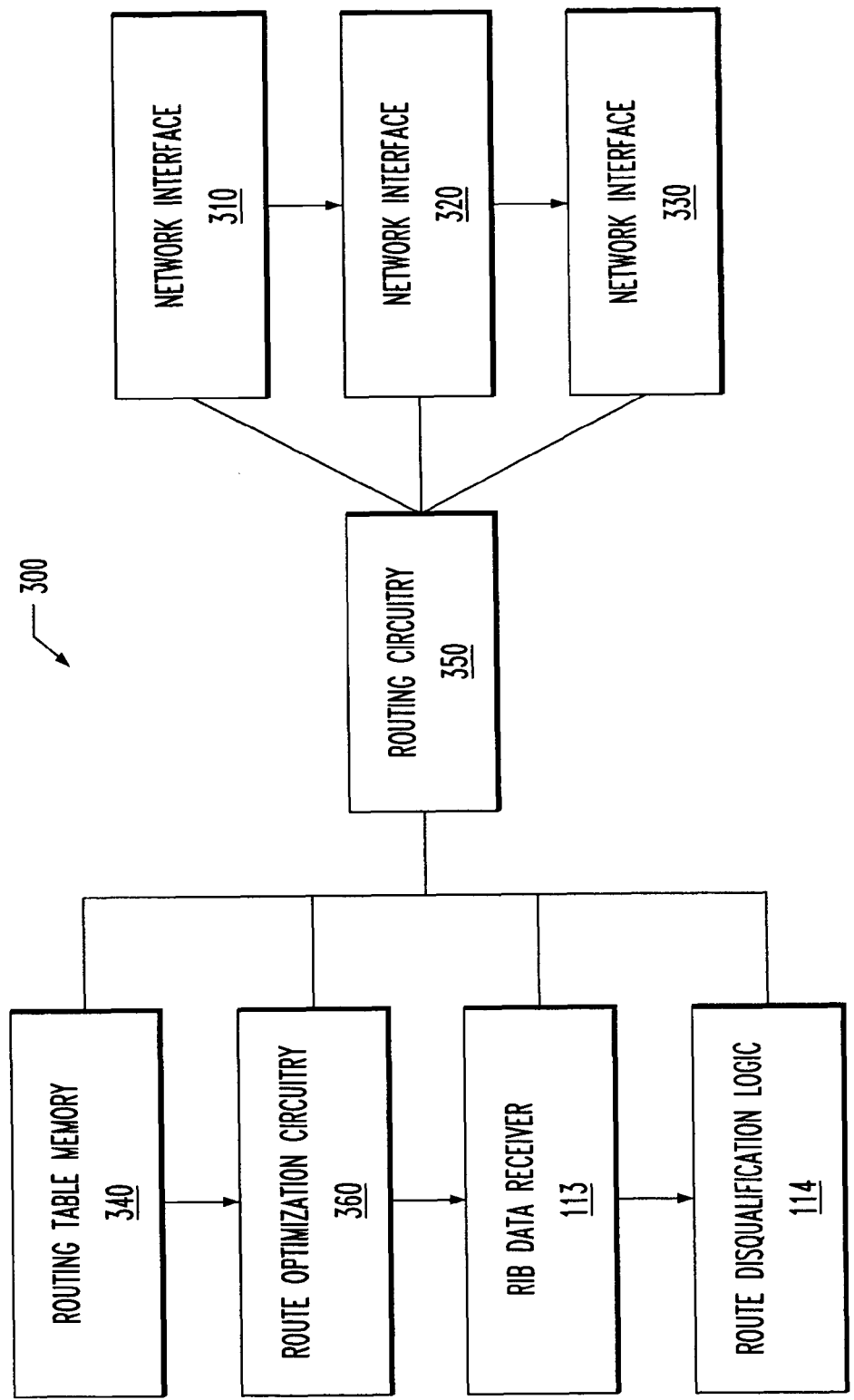
FIG. 3 illustrates a border gateway router incorporating the system of FIG. 1 or the method of FIG. 2.

Turning now to FIG. 3, illustrated is a border gateway router, generally designated 300, incorporating the system 112 of FIG. 1 or the method 200 of FIG. 2. The border gateway router 300 is illustrated as including at least three network interfaces 310, 320, 330.

The border gateway router 300 is also illustrated as including routing table memory 340 that contains a table of active routes. Routing circuitry 350 is coupled to the at least three network interfaces 310, 320, 330 and the routing table memory 350. The routing circuitry 350 routes packets (perhaps Internet Protocol, or IP, packets) among the at least three network interfaces 310, 320, 330 based on addresses contained in the packet and further based on the table of active routes contained in the routing table memory 340. The border gateway router 300 is further illustrated as including BGP route optimization circuitry 360. The BGP route optimization circuitry 360 is coupled to the routing table memory 340 and is responsible for loading the active routes into the routing table memory 340 based on an analysis of RIB data.

The two remaining components enumerated in FIG. 3 have been described in detail above but will again be briefly described.

A RIB data receiver 113 is coupled to the route optimization circuitry 360. The RIB data receiver 113 receives RIB data that includes: (1) an update of an active route to a domain in the network that causes the active route to become a withdrawn route and (2) one or more indications, based on loopback addresses associated with autonomous systems through which the withdrawn route passed, of a reachability of the each of the nodes.

Route disqualification logic 114 is associated with the RIB data receiver 113. The route disqualification logic disqualifies alternative routes to the domain based on the indications. The route disqualification logic 114 disqualifies all alternative routes to the domain if all of the nodes are indicated as reachable. The route disqualification logic disqualifies alternative routes to the domain that pass through unreachable ones of the nodes.

Although the present invention has been described in detail, those skilled in the art should understand that they can make various changes, substitutions and alterations herein without departing from the spirit and scope of the invention in its broadest form.

What is claimed is:

1. For use with a path vector routing protocol, a system for increasing alternative route convergence speed, comprising:
   a router information base (RIB) data receiver of a border gateway router, associated with a network, that receives RIB data including:
      an update of an active route to a domain in said network that causes said active route to become a withdrawn route as a result of said active route being lost, and
      indications, based on loopback addresses associated with nodes through which said withdrawn route passed, of a reachability of said each of said nodes; and
   route disqualification logic of said border gateway router, which is associated with said RIB data receiver and which is configured to disqualify alternative routes to said domain based on said indications prior to an alternative route convergence process, wherein said domain is thereby considered unreachable by said process and therefore not considered by said process.

2. The system as recited in claim 1 wherein said route disqualification logic disqualifies all alternative routes to said domain if all of said nodes are indicated as reachable.

3. The system as recited in claim 1 wherein said route disqualification logic disqualifies alternative routes to said domain that pass through unreachable ones of said nodes.

4. The system as recited in claim 1 wherein said nodes are autonomous systems.

5. The system as recited in claim 1 wherein said loopback addresses are distinguishable from ordinary network addresses.

6. The system as recited in claim 5 wherein said loopback addresses are formed in accordance with a Border Gateway Protocol extension.

7. The system as recited in claim 5 wherein said loopback addresses are assigned canonically.

8. For use with a path vector routing protocol, a method of increasing alternative network route convergence speed, comprising:
   receiving RIB data including:
      an update of an active route to a domain in said network that causes said active route to become a withdrawn route as a result of said active route being lost, and
      indications, based on loopback addresses associated with nodes through which said withdrawn route passed, of a reachability of said each of said nodes; and
   disqualifying alternative routes to said domain based on said indications prior to an alternative route convergence process, wherein said domain is thereby considered unreachable by said process and therefore not considered by said process.

9. The method as recited in claim 8 wherein said disqualifying comprises disqualifying all alternative routes to said domain if all of said nodes are indicated as reachable.

10. The method as recited in claim 8 wherein said disqualifying comprises disqualifying alternative routes to said domain that pass through unreachable ones of said nodes.

11. The method as recited in claim 8 wherein said nodes are autonomous systems.

12. The method as recited in claim 8 wherein said loopback addresses are distinguishable from ordinary network addresses.

13. The method as recited in claim 12 further comprising forming said loopback addresses in accordance with a Border Gateway Protocol extension.

14. The method as recited in claim 12 further comprising canonically assigning said loopback addresses.

15. A border gateway router, comprising:
   at least three network interfaces;
   routing table memory that contains a table of active routes;
   routing circuitry, coupled to said at least three network interfaces and said routing table memory, that routes packets among said at least three network interfaces according to a path vector routing protocol based on addresses contained in said at least three network interfaces and said table of active routes;
   route optimization circuitry, coupled to said routing table memory, that loads said active routes into said routing table memory based on an analysis of router information base (RIB) data;
   a RIB data receiver, coupled to said route optimization circuitry, that receives RIB data including:
      an update of an active route to a domain in said network that causes said active route to become a withdrawn route as a result of said active route being lost, and
      indications, based on loopback addresses associated with autonomous systems through which said withdrawn route passed, of a reachability of said each of said nodes; and
   route disqualification logic, which is associated with said RIB data receiver and configured to disqualify alternative routes to said domain based on said indications prior to an alternative route optimization process, wherein said domain is thereby considered unreachable by said process and therefore not considered by said process.

16. The border gateway router as recited in claim 15 wherein said route disqualification logic disqualifies all alternative routes to said domain if all of said autonomous systems are indicated as reachable.

17. The border gateway router as recited in claim 15 wherein said route disqualification logic disqualifies alternative routes to said domain that pass through unreachable ones of said autonomous systems.

18. The border gateway router as recited in claim 15 wherein said loopback addresses are distinguishable from ordinary network addresses.

19. The border gateway router as recited in claim 18 wherein said loopback addresses are formed in accordance with a Border Gateway Protocol extension.

20. The border gateway router as recited in claim 18 wherein said loopback addresses are assigned canonically.

* * * * *